United States Patent [19]
Cho

[11] Patent Number: 6,166,367
[45] Date of Patent: Dec. 26, 2000

[54] PROGRAMMABLE ANALOG ARITHMETIC CIRCUIT FOR IMAGING SENSOR

[75] Inventor: Kwang-Bo (Austin) Cho, Los Angeles, Calif.

[73] Assignee: Photobit Corporation, Pasadena, Calif.

[21] Appl. No.: 09/277,617

[22] Filed: Mar. 26, 1999

Related U.S. Application Data

[60] Provisional application No. 60/079,712, Mar. 26, 1998.

[51] Int. Cl.[7] .................................................. H01L 27/00
[52] U.S. Cl. ....................... 250/208.1; 348/294; 348/302; 348/308; 341/155
[58] Field of Search ......................... 250/208.1; 348/241, 348/250, 294, 302–304, 307–311, 315; 341/155

[56] References Cited

U.S. PATENT DOCUMENTS

| | | | |
|---|---|---|---|
| 5,097,305 | 3/1992 | Mead et al. | 257/292 |
| 5,324,958 | 6/1994 | Mead et al. | 257/291 |
| 5,410,348 | 4/1995 | Hamasaki | 348/296 |
| 5,436,442 | 7/1995 | Michon et al. | 250/208.1 |
| 5,512,750 | 4/1996 | Yanka et al. | 250/338.4 |
| 5,793,322 | 8/1998 | Fossum et al. | 341/155 |
| 5,841,126 | 11/1998 | Fossum et al. | 250/208.1 |
| 5,886,659 | 3/1999 | Pain et al. | 341/155 |
| 6,005,619 | 12/1999 | Fossum | 348/315 |
| 6,021,172 | 2/2000 | Fossum et al. | 377/60 |
| 6,043,690 | 3/2000 | Krymski et al. | 327/112 |
| 6,049,247 | 4/2000 | Krymski | 330/9 |
| 6,087,970 | 7/2000 | Panicacci | 341/172 |

FOREIGN PATENT DOCUMENTS

WO 99/46929A1  9/1999  WIPO ............. H04N 5/217

*Primary Examiner*—Georgia Epps
*Assistant Examiner*—David N. Spector
*Attorney, Agent, or Firm*—Fish & Richardson P.C.

[57] ABSTRACT

A programmable arithmetic circuit to form multiple circuit modules for different arithmetic operations that share certain common electronic elements to reduce the number of elements. Such circuit can be integrated to an imaging sensor array such as a CMOS active pixel sensor array to form arithmetic operations and analog-to-digital conversion for imaging processing.

23 Claims, 15 Drawing Sheets

PROGRAMMABLE ANALOG ARITHMETIC CIRCUIT FOR IMAGING SENSOR

This application claims the benefit of U.S. Provisional application Ser. No. 60/079,712, filed on Mar. 26, 1998.

TECHNICAL FIELD

This invention generally relates to signal processing in electronic circuits and circuit architecture, and more specifically, to arithmetic processing and circuits for imaging sensors.

BACKGROUND

An electronic device may perform different signal processing operations at different stages of a task. Such a device usually implements different circuit modules to carry out these different signal processing operations. Hence, a device may require many separate circuit modules.

An imaging sensor has an array of sensing pixels each producing charge carriers indicative of the amount of received radiation. The charge carriers from each pixel may be converted into an electrical pixel signal (e.g., a voltage) which is further processed by a subsequent processing circuit. Imaging sensors are becoming increasingly complex and are built with processing circuits having different circuit blocks to perform many processing operations. For example, a multiresolution sensor may have a processing circuit comprising different function blocks for summing, averaging, and analog to digital conversion.

Such a processing circuit of many circuit modules is subject to certain limitations. For example, the circuit modules occupy valuable real estate on a silicon substrate and increase the cost These and other limitations are specially problematic when the processing circuit is integrated onto the sensing array because the silicon area occupied by the processing circuit limits the space available for the photosensitive part and hence reduces the number of sensing pixels.

Therefore, it is desirable to reduce the number of circuit elements in a processing circuit capable of performing multiple signal-processing tasks.

This disclosure describes circuit architecture and associated methods for providing a special multi-task analog arithmetic circuit with a significantly reduced number of electronic elements compared to many known multi-task arithmetic circuits of the same or similar functions. This special arithmetic circuit is programmable and implements multiple circuit modules that share certain common electronic elements to reduce the number of elements. Controllable switches are provided to couple the shared common electronic elements to different circuit modules as desired. A control unit controls the switches to couple selected shared elements to form a circuit module that is activated to perform a desired arithmetic operation.

One embodiment of this special multi-task arithmetic circuit is an image processing circuit coupled to an imaging sensor array. The circuit includes a reconfigurable arithmetic circuit having a plurality of circuit elements and a plurality of switches to perform first and second arithmetic operations on pixel electrical signals from the imaging sensor array, and a control circuit coupled to control a first set of switches to couple a first set of circuit elements to form a first circuit to perform the first arithmetic operation and a second set of switches to couple at least part of the first set of circuit elements and a second set of circuit elements to form a second circuit to perform the second arithmetic operation.

Another embodiment of the special multi-task arithmetic circuit includes a sensor array of pixels to detect an input image, a reconfigurable arithmetic circuit having an array of column-parallel arithmetic cells respectively coupled to columns of the sensor array and reconfigurable to form different arithmetic circuits to perform arithmetic operations, and a control circuit coupled to the arithmetic cells and to control each arithmetic cell to perform at least addition, subtraction, multiplication, and division operations on signals from the sensor array.

The arithmetic cell includes the following elements: (1) a first signal sampling capacitor to receive the pixel signal, (2) a first switched capacitor integrator coupled to the first signal sampling capacitor, (3) a second signal sampling capacitor coupled to the first switched capacitor integrator, (4) a second switched capacitor integrator coupled to the second signal sampling capacitor, (5) a plurality of electronic switches coupled to control the sampling capacitors and the integrators and their interconnections, and (6) a plurality of communication channels having switches to couple each arithmetic cell to at least one adjacent arithmetic cell.

The communication channels may include first and second signal communication channels to provide communication between different columns. The first communication channel couples one terminal of the first signal sampling capacitor in the arithmetic cell to a corresponding terminal of a corresponding first signal sampling capacitor in the at least one adjacent arithmetic cell. The second signal communication channel couples one terminal of the second signal sampling capacitor in the arithmetic cell to a corresponding terminal of a corresponding second signal sampling capacitor in the at least one adjacent arithmetic cell.

The first switched capacitor integrator includes a signal integrating capacitor and the communication channels include a signal capacitor channel to couple one terminal of the signal integrating capacitor in the arithmetic cell to a corresponding terminal of a corresponding signal integrating capacitor in the at least one adjacent arithmetic cell.

Each pixel of the sensor array may be configured to produce a pixel signal indicative of a total of photo-induced pixel signal and non-photo-induced background signal and a pixel reset signal indicative of the non-photon-induced background signal. Accordingly, the reconfigurable arithmetic circuit may include two parallel processing channels, one for signals associated with the pixel signals and another for signals associated with the pixel reset signals of the sensor array.

These and other aspects and associated advantages of the present invention will become more apparent in light of the following detailed description, the accompanying drawings, and the claims.

DETAILED DESCRIPTION

The present disclosure is in part based on the recognition that certain electronic elements are common to different arithmetic circuit modules. When these circuit modules perform their respective arithmetic operations at different times in a given analog arithmetic circuit, these common elements in one circuit module are being actively used at one given moment while the same common elements in other circuit modules are not used. Therefore, it becomes possible to share such common elements among different circuit modules.

The analog arithmetic circuit may be specially structured to share these common elements. Controllable switches are disposed in desired locations in the analog arithmetic circuit to couple these common elements to form proper circuit modules. Such sharing of common electronic elements reduces the overall number of elements in the analog arithmetic circuit without compromising its functionality.

Figure 1:
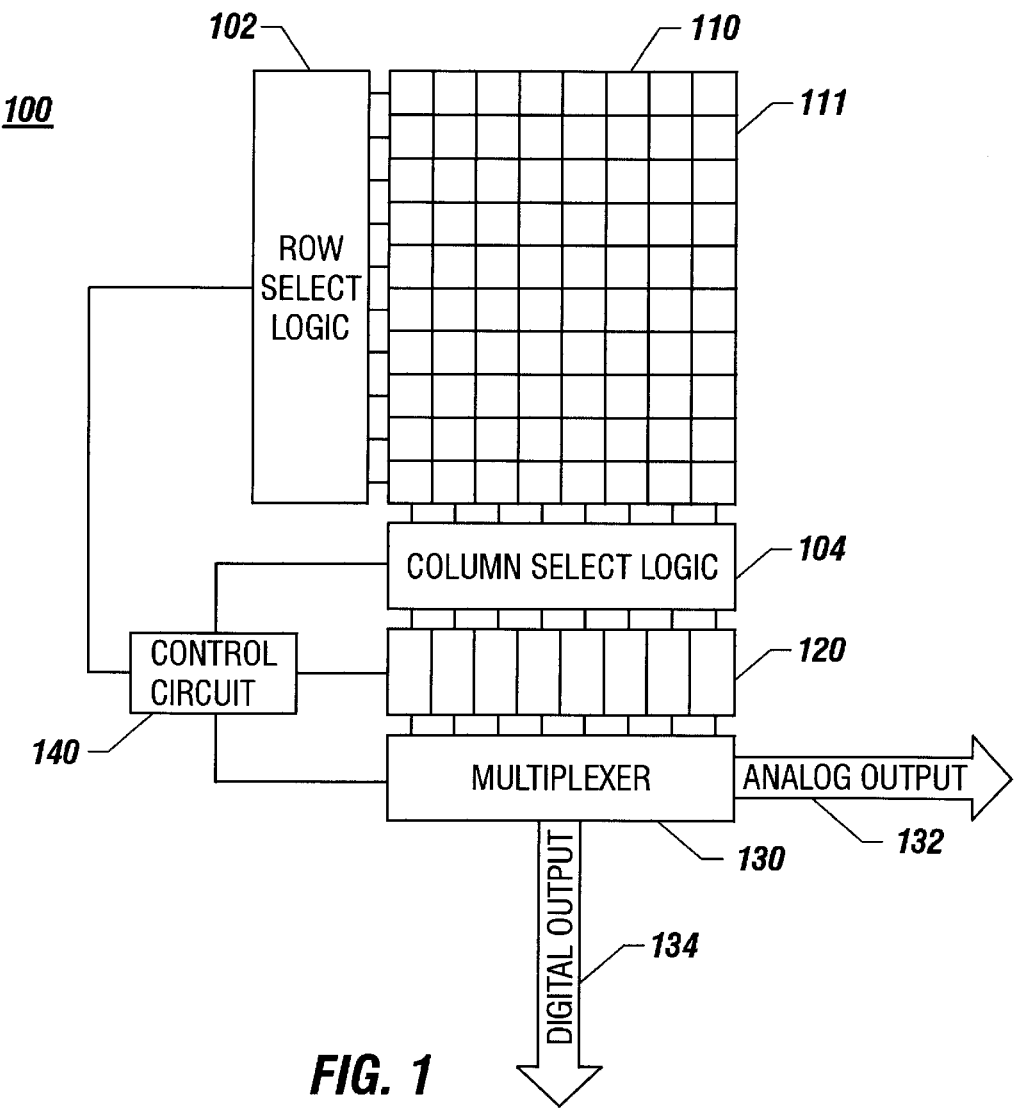
FIG. 1 shows one embodiment of an imaging device.

FIG. 1 shows one implementation of a semiconductor imaging device 100 having a programmable analog arithmetic circuit 120 that shares certain common electronic elements among different circuit modules. The imaging device 100 includes a sensor array 110 for detecting an input scene, a row select logic 102 and a column select logic 104 for selecting pixels, and the arithmetic circuit 120 for performing certain arithmetic operations of pixel signals. The arithmetic circuit 120 may include a block summing module that adds signals of a selected block of pixels, a block averaging module that produces an averaged signal for a selected block of pixels, an analog-to-digital converter and other arithmetic modules for operations such as addition, subtraction, multiplication, and division. A multiplexer 130 is coupled to route the output signals from the arithmetic circuit 120 to proper output terminals, e.g., an analog output port 132, and a digital output port 134.

A control circuit 140 is also provided to control operations of the circuits 102, 104, 120, and 130. In particular, the control circuit 140 is designed to control the electronic switches within the arithmetic circuit 120 so as to program it into different arithmetic circuit modules for different operations. The some switching schemes will be described in detail by examples.

The sensor array 110 may be any radiation-sensitive array of pixels capable of converting an input scene into pixel electrical signals. The preferred type of such sensor arrays is an active pixel sensor ("APS") where each pixel uses a CMOS image sensor 111 to directly convert photo-induced charge into an electrical signal and has an active transistor. Each pixel may also include an in-pixel buffer circuit to buffer the signal and an in-pixel select transistor to output the buffered signal in response to a received control signal. U.S. Pat. No. 5,471,515 to Fossum et al. discloses a CMOS APS device capable of producing a reset signal (Vrst) of a pixel prior to an integration and a signal (Vsig) of that pixel at the end of the integration period. Hence, the reset signal Vrst represents non-photon-induced background level in the pixel and the signal Vsig includes both the reset signal and the photon-induced signal. Therefore, the difference between the reset signal Vrst and the signal Vsig is the photo-induced signal for that pixel and is free of KTC noise and fixed pattern noise.

The signal acquisition in the imaging device 100 preferably uses a column-parallel configuration. The arithmetic circuit 120 is a linear array of arithmetic cells corresponding to columns of the sensor array 110. Each arithmetic cell receives signals from a respective column or more than one column, and is coupled with other arithmetic cells as desired. Each arithmetic cell in general includes multiple arithmetic modules that share certain common circuit elements. As an example, each arithmetic cell in the following description has three different arithmetic modules: a block summing module, a block averaging module, and an analog-to-digital converter.

Figure 2:
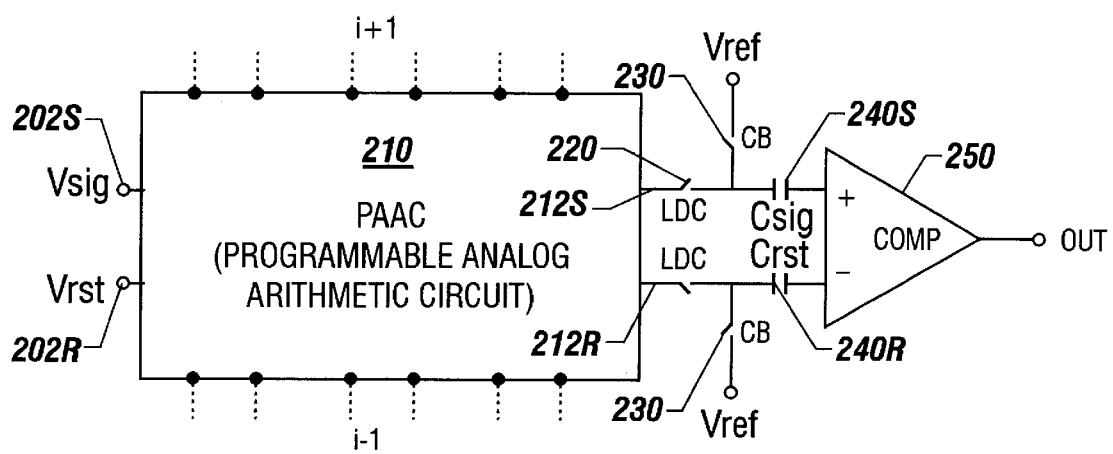
FIG. 2 shows one embodiment of a programmable analog arithmetic circuit cell.

FIG. 2 shows one embodiment 200 of the arithmetic cell having a programmable analog arithmetic circuit ("PAAC") unit 210. The PAAC unit 210 includes two switched capacitor integrators for summing and averaging pixel signals. Two inputs 202S and 202R are coupled to receive the signals Vsig and Vrst from a respective column in the sensor array 110. The received signals Vsig and Vrst are processed to produce corresponding output signals at outputs 212S and 212R, respectively. Two sample and hold capacitors Csig 240S and Crst 240R are respectively connected to the outputs 212S and 212R through two switches 220. A comparator 250 is coupled to receive signals from the capacitors 240S and 240R for implementing a cyclic analog-to-digital converter. A reference voltage Vref is coupled to the receiving ends of the capacitors 240S and 240R via switches 230. Inter-cell communication channels are also provided to allow the PAAC unit in one cell to communicate with one or two adjacent PAAC units.

Figure 3:
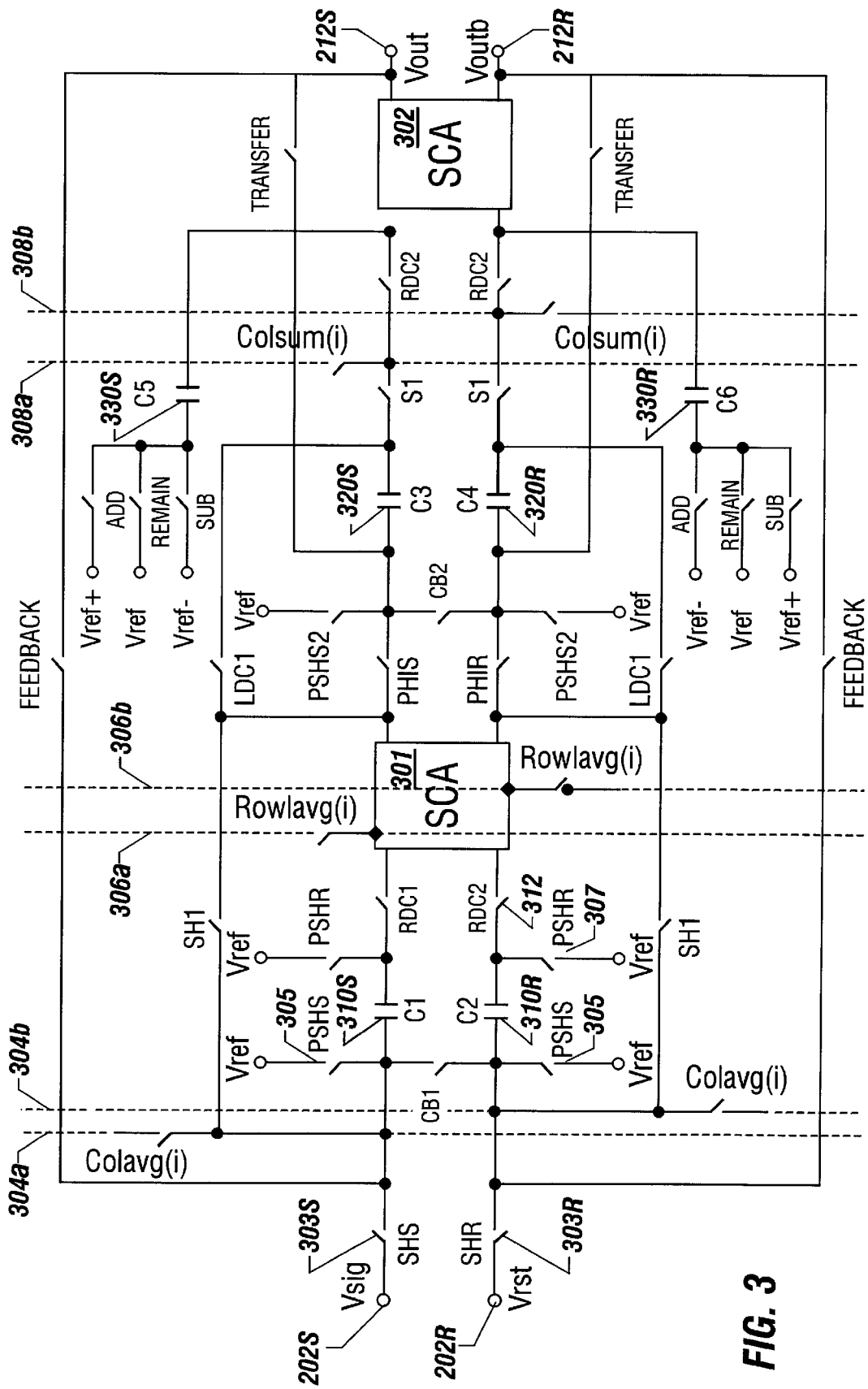
FIG. 3 shows a circuit implementation of the embodiment of FIG. 2.

FIG. 3 shows a detailed circuit diagram of the PAAC unit 210. Two switched capacitor integrators 301 and 302, and capacitors C1, C2, C3, and C4 are coupled through a network of switches to effect a block summing module and a block averaging module. They are further coupled to capacitors C5, C6, Csig, Crst and the comparator 250 to form a cyclic analog-to-digital converter. Switchable inter-cell communication channels 304a, 304b, 306a, 306b, 308a, and 308b connect each arithmetic cell to two adjacent arithmetic cells and hence other arithmetic cells so that signals can be communicated between different columns. For example, under proper switching configurations, communication channels 304a and 304b allow charge sharing between the signal sampling capacitors 310S and between the reset sampling capacitors 310R of two adjacent cells, respectively. Communication channels 306a and 306b allow charge sharing between the signal sampling capacitors Cs1 and between the reset sampling capacitors Cs2 of the first switched capacitor integrators 301 of two adjacent cells, respectively.

Figure 4:
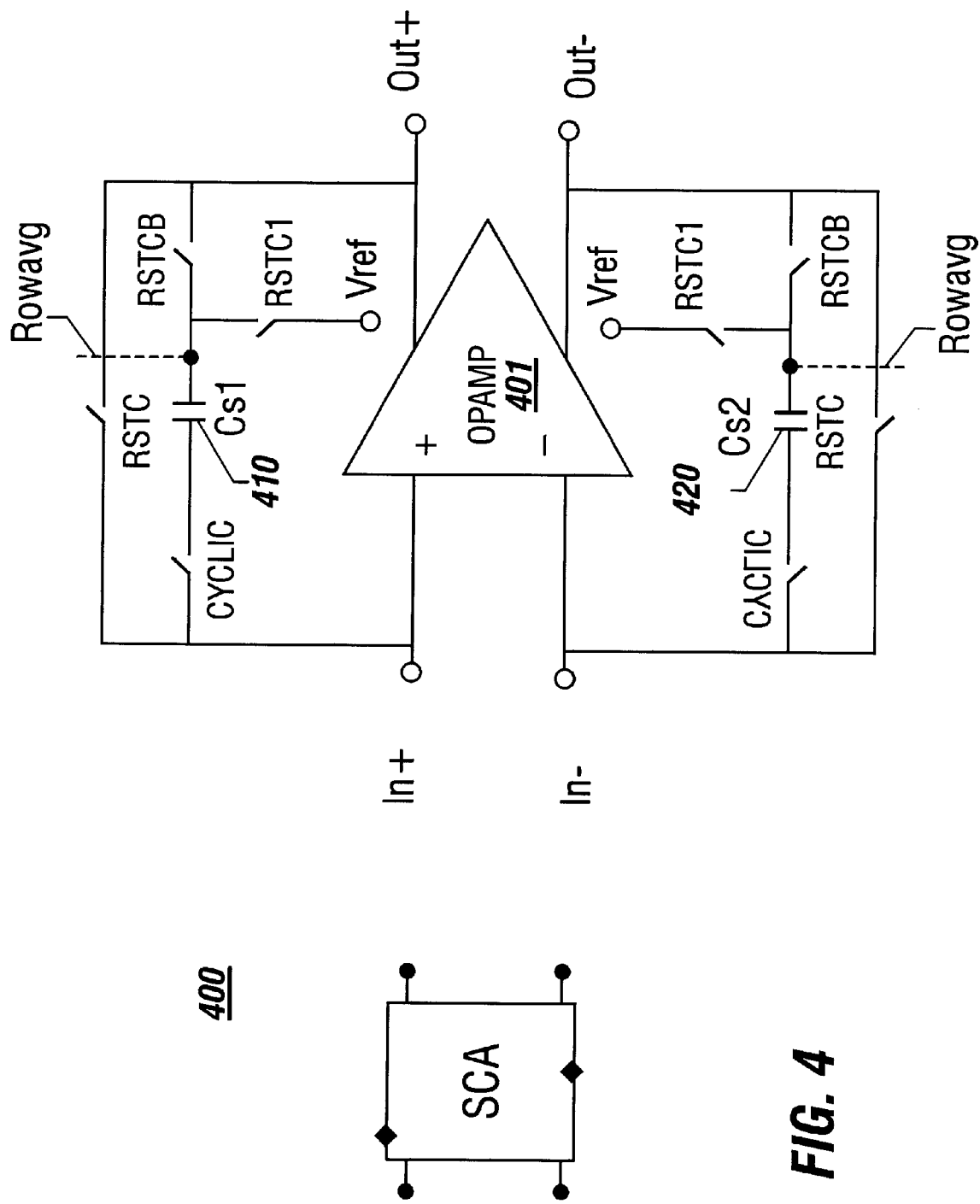
FIG. 4 shows a switched capacitor integrator.

Each switched capacitor integrator includes two integration channels: a signal channel for integrating a signal associated with the pixel signal Vsig and a reset channel for integrating a signal associated with the pixel reset Vrst. FIG. 4 shows one embodiment of a switched capacitor integrator 400 based on an operational amplifier 401 where capacitors 410 (Cs1) and 420 (Cs2) respectively hold signals associated with Vsig and Vrst. This switched capacitor integrator 400 can generate a differential output which is substantially free of any fixed pattern noise associated with a column. For example, one source of the column-wise fixed pattern noise is caused by the difference in the DC offsets of different operational amplifiers 401 in different columns. The integrator 400 can operate in a way to compensate for the offset error at each step of integration and hence prevents such column-wise noise from accumulation in the integration process.

Figure 5A:
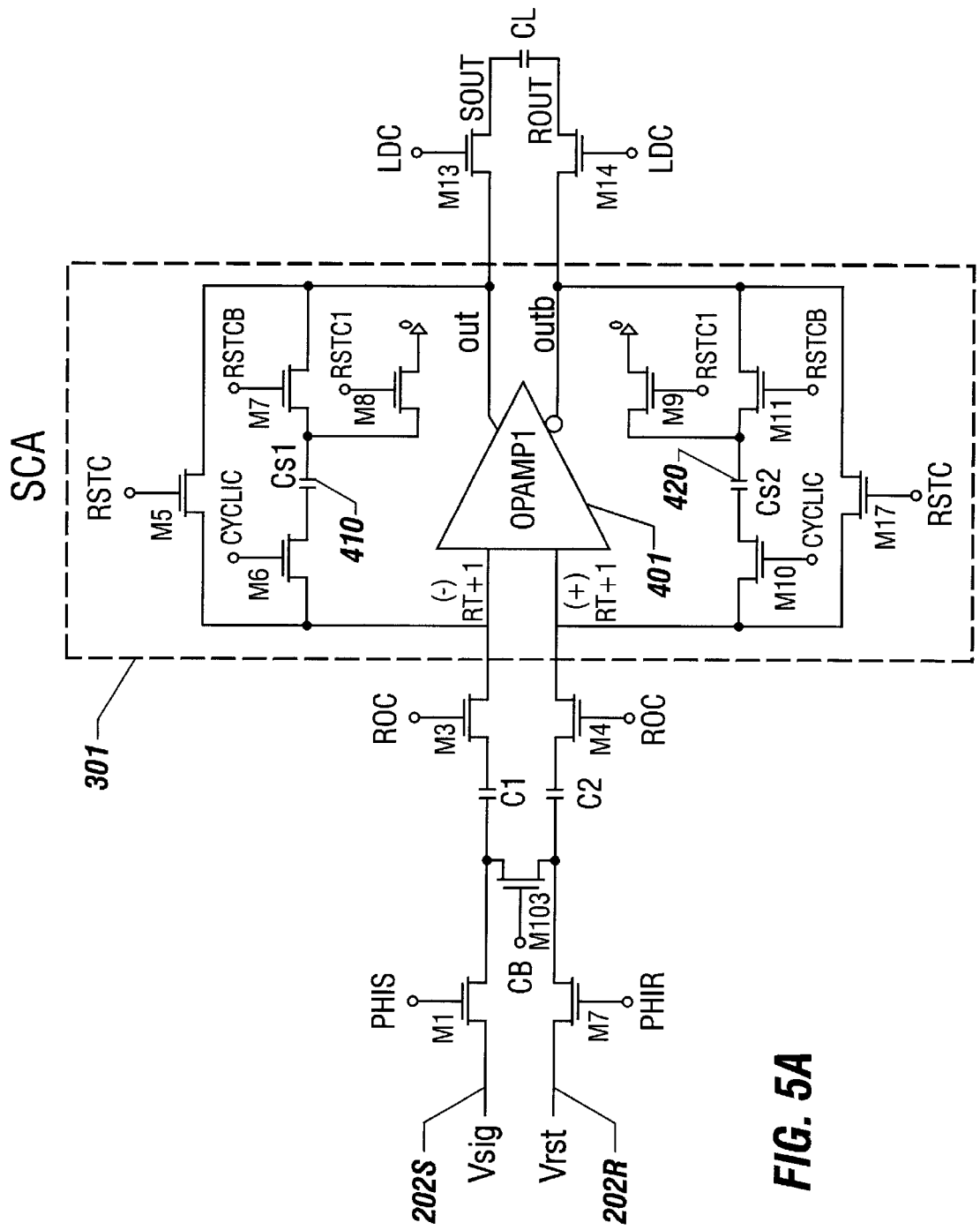
FIG. 5A shows a circuit implementation of the integrator of FIG. 4.
Figure 5B:
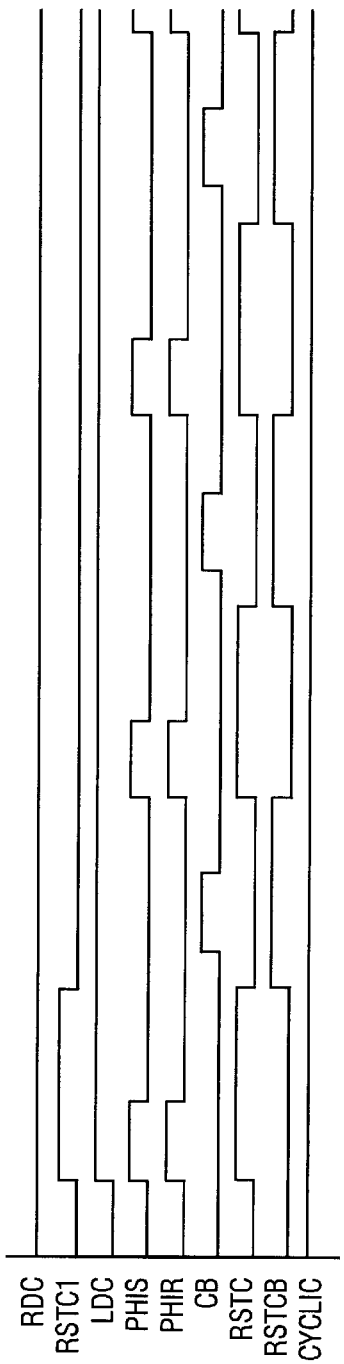
FIG. 5B shows the timing diagram for the integrator of FIG. 5A.

FIG. 5A shows an integration circuit based on the switched capacitor integrator 400 and illustrates how the column-wise noise is eliminated. The operation of the circuit is shown by the timing diagram in FIG. 5B. The integrator is reset with RSTC on, RSTCB is off to disconnect the feedback capacitors 410, 420 from the output of the amplifier 401. During the reset, the pixel reset (Vrst) and signal (Vsig) levels are sampled onto C1 and C2 respectively through PHIS and PHIR. At the first time reset, RSTC1 is also turned on so that the offset voltages are sampled onto C3 and C4 respectively. Next, switches RSTC, RSTC1 are turned off and RSTCB is turned on to terminate the reset process. Subsequently, the crowbar switch CB is closed so that the sampled signals on C1 and C2 are transferred to feedback capacitors C3 and C4. Using the charge conservation, the output voltages on the signal side and the reset side are $Vos = -(C1/C3)(Vsig-Vcb)$, $Vor = -(C2/C4)(Vrst-Vcb)$, where Vcb is the potential at the shared node of C1 and C2 when switch CB is closed. The differential output is given by, $Vor-Vos = -(C2/C4)Vrst + (C1/C3)Vsig = -(C1/C3)(Vrst-Vsig)$, where it is assumed that C1=C2 and C3=C4. Hence, the offset errors are compensated in the integration and do not appear at the output of the integrator.

During integration, RSTC1 is off all the time. The integrator is reset by turning off RSTCB and turning on RSTC. The integration charge is stored on the feedback capacitors while resetting the integrator. Similar sampling of the new input levels Vrst,i and Vsig,i is performed as the integrator resets itself. The differential output voltage after ith step of integration is, $Vor,i-Vos,i = Vor,i-1-Vos,i-1-(C1/C3)(Vrst,i-Vsig,i)$.

Hence, the op amp offset is compensated at each step of integration. This compensation is achieved by sampling the errors onto the feedback capacitors during the first true reset period and onto the input capacitors during every reset period.

In addition to the benefit in compensating for the op amp offsets, this fully differential switched capacitor integrator also rejects most of the switch feedthrough. The switch feedthrough will appear as common mode voltage at the inputs and hence be rejected by the differential amplifier.

Referring back to FIGS. 2 and 3, the arithmetic cell 200 can reconfigure itself to perform different arithmetic operations in response to control signals from the control circuit 140 by sharing the switched capacitor integrators 301 and 302 and other circuit elements among different arithmetic modules. The following describes examples of controlling and reconfiguring the arithmetic cell 200 to function as a block averaging module, a block summing module, and a cyclic analog-to-digital converter.

1. Block Averaging Module

Figure 6A:
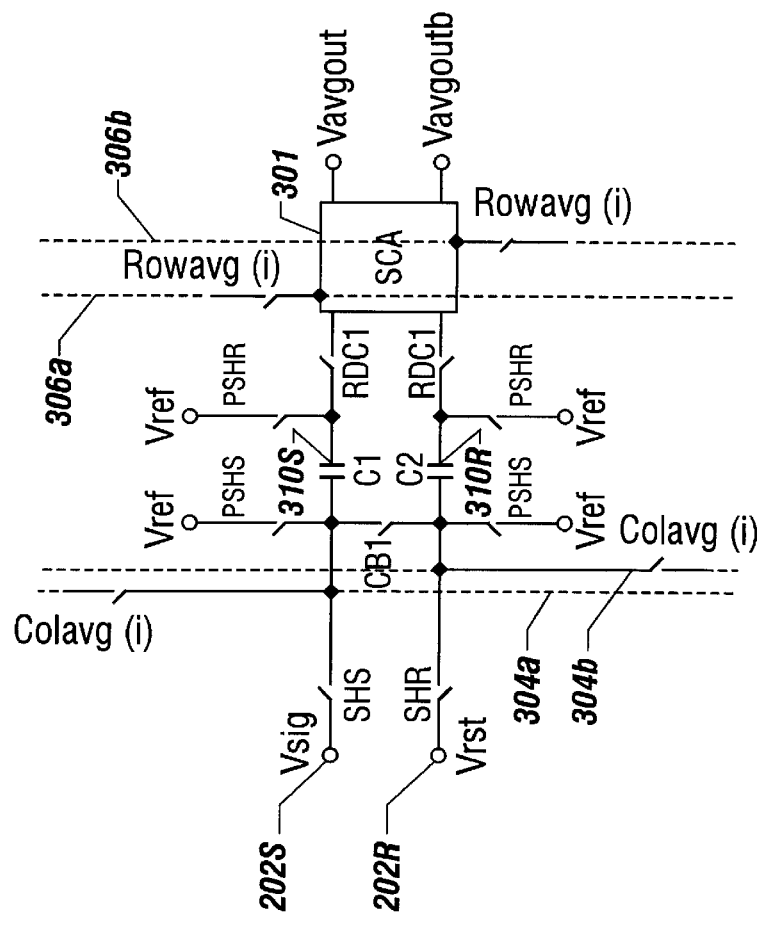
FIG. 6A shows one configuration of the programmable analog arithmetic circuit cell for performing block averaging.

The PAAC unit 210 can form a block averaging module by using the capacitors 310, 312, and the first switched capacitor integrator 301. FIG. 6A shows the relevant part of the PAAC unit 210 that forms the block averaging module. In this configuration, the arithmetic circuit 120, coupled to columns of the sensor array 110, becomes a bank of switched capacitor integrators as shown in FIG. 6A that are interconnected through a set of switches. By appropriately switching in additional capacitance from adjacent columns, switched capacitor charge integrators with variable integration gain can be achieved.

A selected block of pixels is averaged in two steps. First, image pixel values in a given row of the selected block are averaged. Second, averaged values of different rows in the selected block are averaged to produce the average value for the entire selected block. The block averaging is performed through charge sharing in this bank of capacitors with proper switching.

Figure 6B:
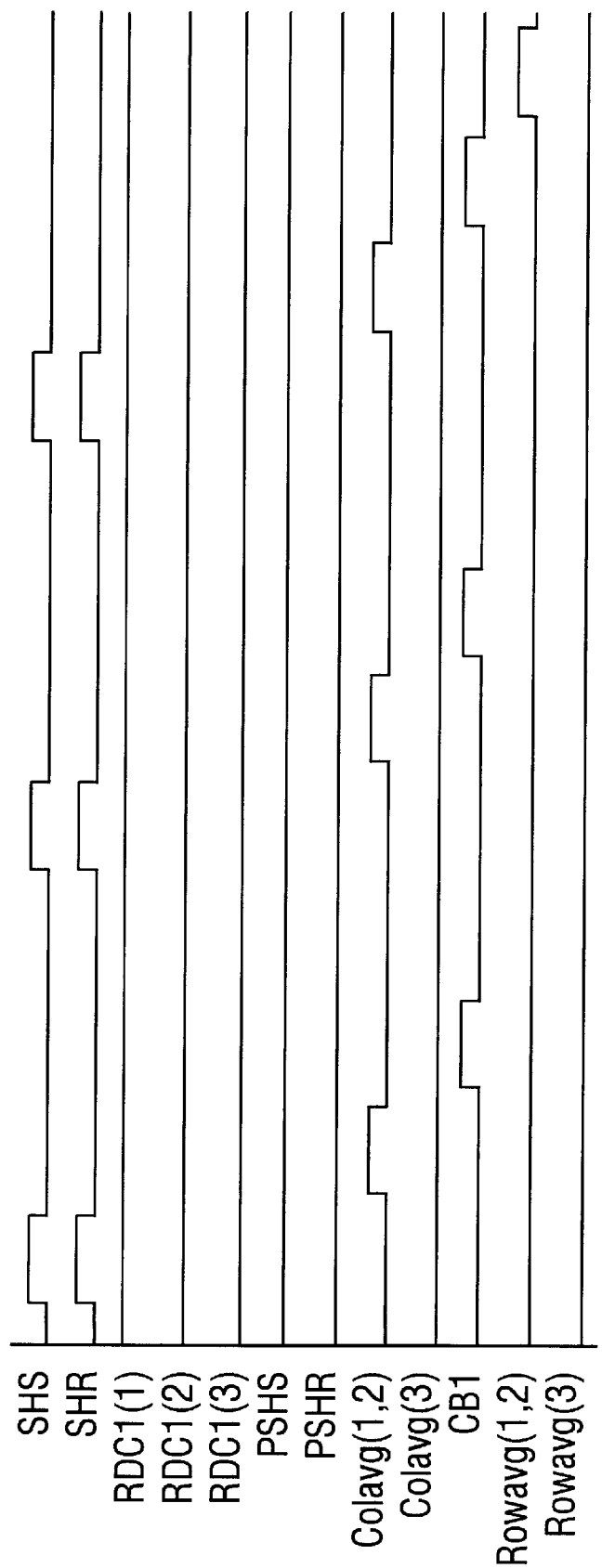
FIG. 6B shows the timing diagram for the block averaging circuit in FIG. 6A.

FIG. 6B is the timing diagram for operations of the switches in FIG. 6A to average a 3×3 block of pixels. During the entire averaging operations, the switch RDC1(1) for the first column of the selected block is on and switches RDC1(2) and RDC1(3) for the second and third columns are off. First, the pixels of the first row in the selected block are sampled into the capacitors C1 and C2 in the respective arithmetic cells when Switches 303S (SHS) and 303R (SHR) are on and the switch CB1 is off. Then, a column average of the three pixels in the first row is carried out by turning on the Colavg switches for the first and second columns (Colavg(1)=1, Colavg(2)=1) while the Colavg switch for the third column remains off (Colavg(3)=0). Next, the crowbar switch CB1 is closed to transfer the averaged values of the first row for the signal side and the reset side onto capacitors Cs1 and Cs2 of the first switched capacitor integrator of the first column.

The above averaging process repeats to obtain the averaged values for the second and third rows in the selected block. Hence, the accumulated value in each of the capacitors Cs1 and Cs2 of the first column is the sum of column averages for all three rows. Next, the switches Rowavg(1) and Rowavg(2) for the first and second columns are turned on by setting Rowavg(1)=1, Rowavg(2)=1 while the switch Rowavg(3) for the third column remains off (Rowavg(3)=0). This operation distributes the accumulated charge in each of the capacitors Cs1 and Cs2 in the first column to the respective capacitors in the second and third columns. Therefore, the charge in each column is one third of the total charge previously stored in the first column and hence is the average value of the selected block.

Figure 6C:
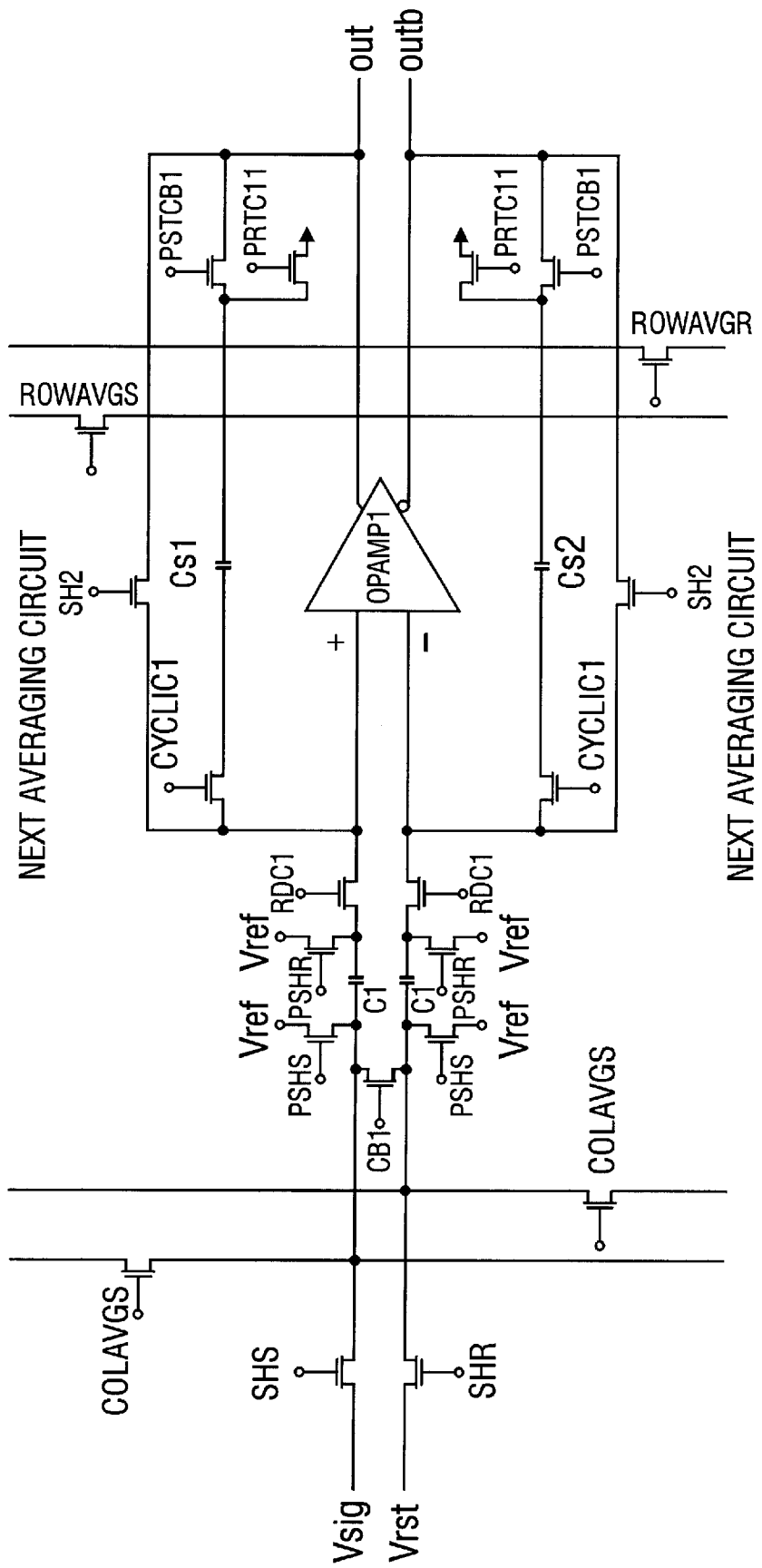
FIG. 6C shows a circuit implementation of the circuit of FIG. 6A.

FIG. 6C shows one circuit implementation of the block averaging module in FIG. 6A.

2. Block Summing Module

Figure 7A:
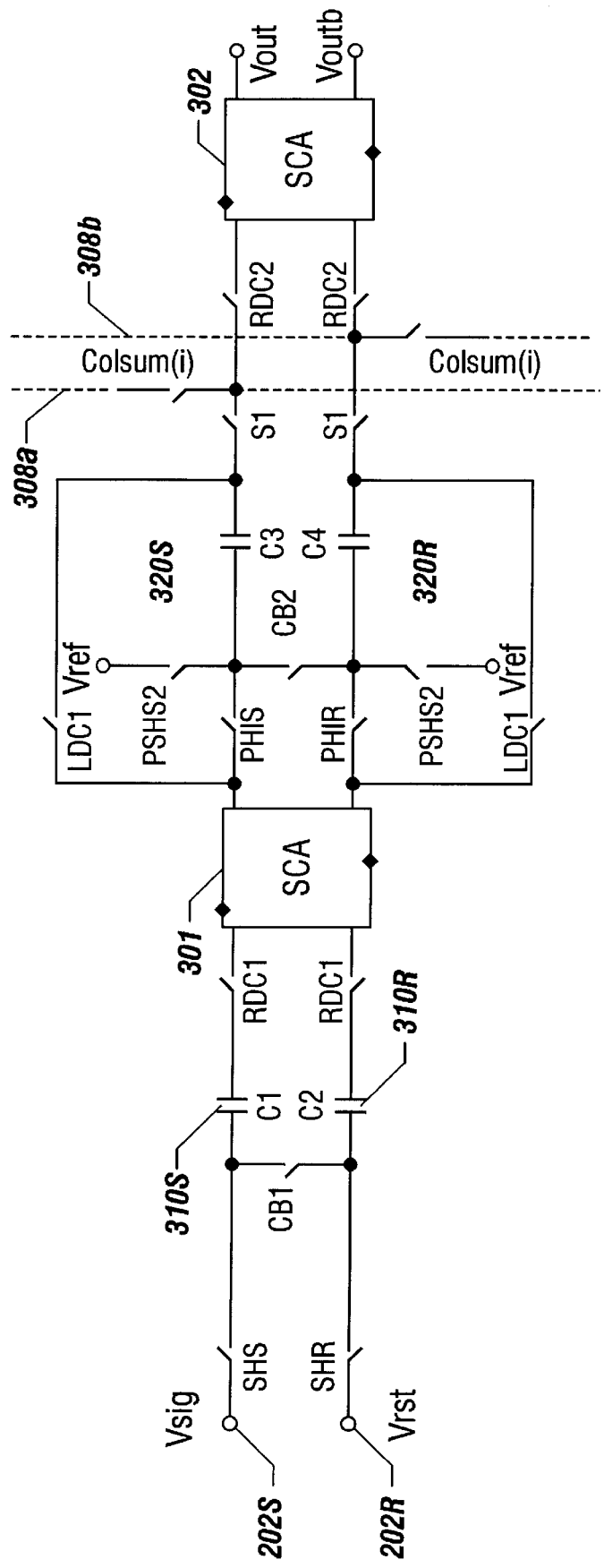
FIG. 7A shows one configuration of the programmable analog arithmetic circuit cell for performing block summing.

The PAAC unit 210 forms a block summing module by using the capacitors 310S, 310R, 320S, 320R and both the first and second switched capacitor integrators 301 and 302. FIG. 7A shows the relevant part of the PAAC unit 210 that forms the block averaging module. In this configuration, the first switched capacitor integrator 301 performs the row summing and the second switched capacitor integrator 302 performs the column summing. FIG. 7C shows one circuit implementation of the block summing circuit in FIG. 7A.

Figure 7B:
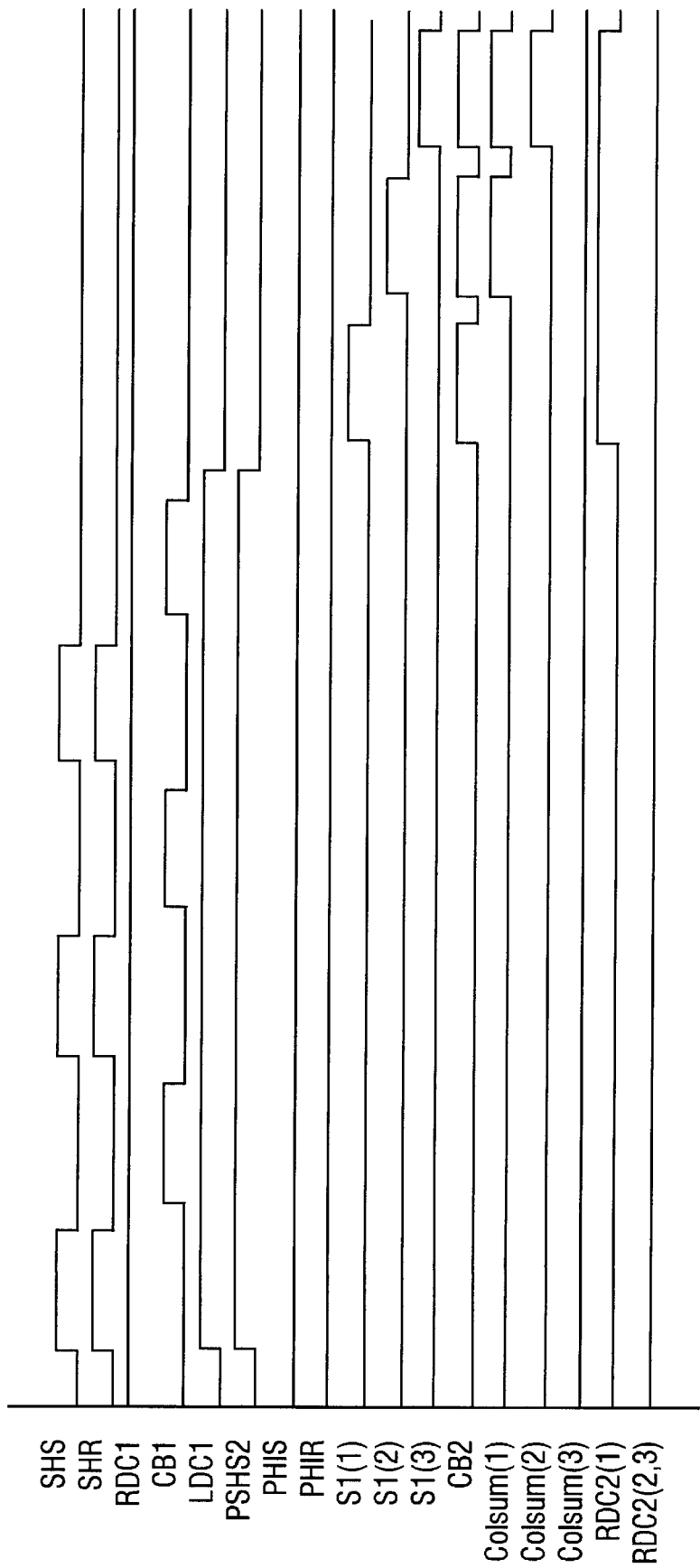
FIG. 7B shows the timing diagram for the block summing circuit in FIG. 7A.
Figure 7C:
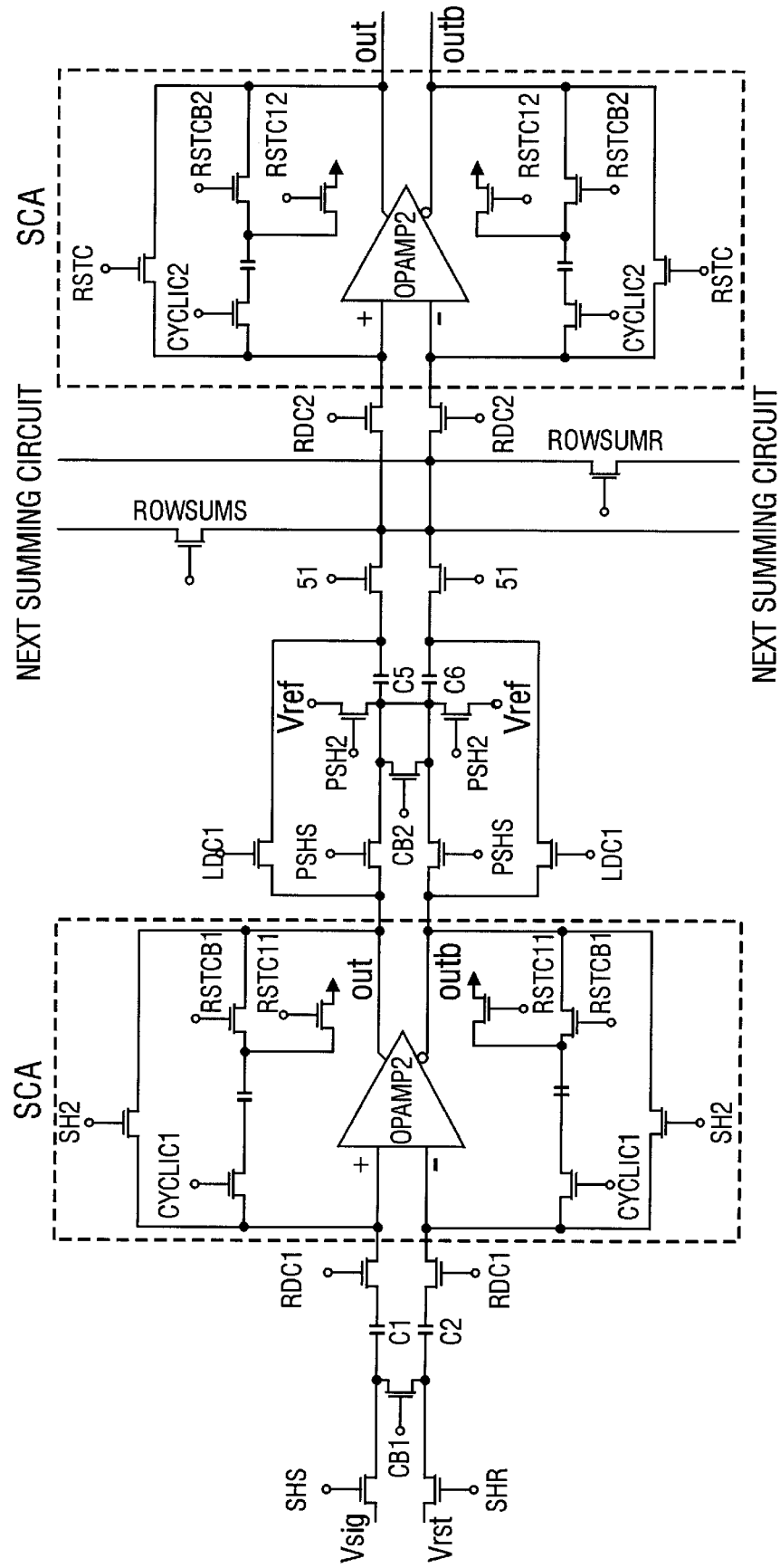
FIG. 7C shows a circuit implementation of the circuit of FIG. 7A.

FIG. 7B is the timing diagram for operations of the switches in FIG. 7A to sum the pixel signals from a 3×3 block. The block sum is performed in two steps. First, different rows in each column are sampled into the capacitors C1, C2 and then added in the capacitors Cs1, Cs2 in the first switched capacitor integrator. Since the switches LDC1 are on, the accumulated values in the capacitors Cs1 and Cs2 are transferred to the capacitors C3, and C4, respectively. This completes the row summing.

Next, different columns are summed. This is done by sequentially transferring the summed row values in all columns to the second switched capacitor integrator in a selected column. The summed row values are then added to produce the sum value of the selected block. In the example in FIG. 7B, the switches RDC2 in the second and third columns are off during the block summing and the first column is used to perform the column summing.

The sequence of the above operation is as follows. First, the summed row values in the capacitors C3 and C4 of the first column are respectively transferred to the capacitors Cs1 and Cs2 of the second integrator in the first column by turning on the switch S1 in the first column while the switches S1 in the second and third columns are off, i.e., S1(1)=1, S1(2)=0, and S1(3)=0. During this operation, different columns are isolated from one another by setting Colsum(1)=0, Colsum(2)=0, and Colsum(3)=0. Second, the summed row values in the capacitors C3 and C4 of the second column are transferred by turning on the switch S1 in the second column while the switches S1 in the first and third column are off and the second column is connected to the first column by setting Colsum(1)=1, Colsum(2)=0, and Colsum(3)=0. Lastly, the summed row values in the capacitors C3 and C4 of the third column are transferred by turning on the switch S1 in the third column while the switches S1 in the first and second columns are off and by connecting the second column to the first column by setting Colsum(1)=1, Colsum(2)=1, and Colsum(3)=0.

3. Cyclic Analog-to-Digital Converter

The PAAC unit 210 can also be reconfigured by proper switching to form a cyclic analog-to-digital converter using both switched capacitor integrators 301, 302 and the comparator 250. Although other types of analog-to-digital conversion configurations may in general be used with the sensor array 110, the cyclic configuration is preferred in this embodiment in order to share the circuit resources, such as the two switched capacitor integrators 301, 302, with the block averaging and block summing modules. The cyclic analog-to-digital conversion also provides other advantages, including elimination of capacitor matching while still achieving a desired high conversion accuracy.

Figure 8:
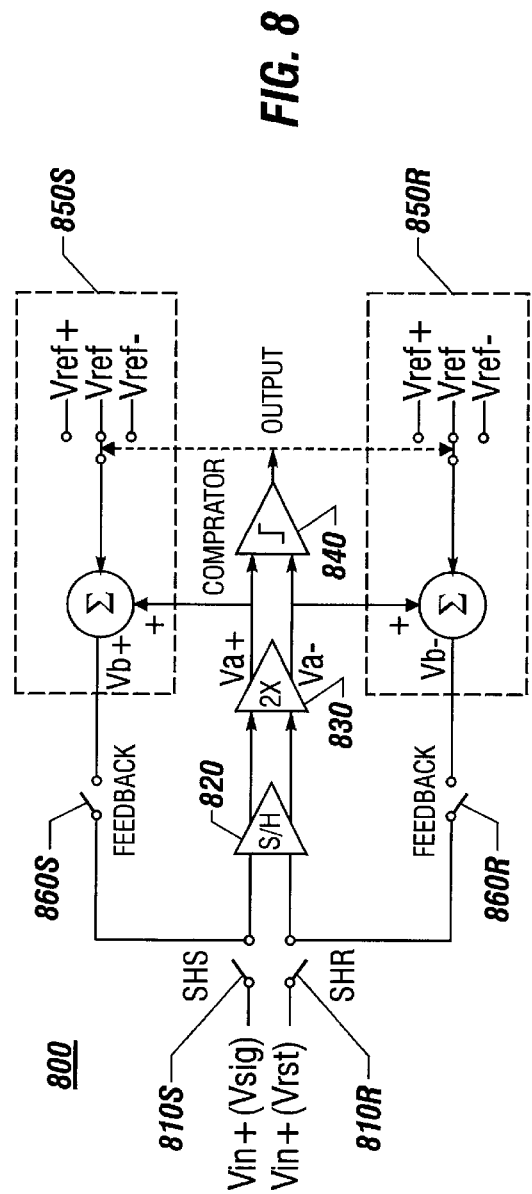
FIG. 8 illustrates a differential cyclic ADC.

FIG. 8 shows a block diagram of a general fully differential cyclic analog-to-digital converter 800. The analog signal side and reset side loops of the ADC 800 include sample switches SHS 810S and SHR 810R, a sample-and-hold (S/H) amplifier 820, a multiply-by-two (2×) amplifier 830, a comparator 840, a reference addition-subtraction circuit 850, and feedback switches 860S and 860R that respectively couple the signal side and reset side loops to respective inputs of the S/H amplifier 820. See, Li et al., in "A Ratio-Independent Algorithmic Analog-to-Digital Conversion Techniques," IEEE Journal of Solid-State Circuits, Vol. SC-19, No.6, 828–836 (1984), the entire disclosure of which is incorporated herein by reference.

In operation, the converter 800 first samples input analog signals Vin+(Vsig) and Vin−(Vrst) to be converted onto the S/H amplifier. The multiply-by-two amplifier 830 receives and amplifies the signals Vin+(Vsig) and Vin−(Vrst) to produce output signals Va+ and Va−. Next, the signals Va+ and Va− are compared by the comparator 840 to extract digital information from the input signals Vin+ and Vin−. If Va+ is larger than Va−, the corresponding bit is set to 1. Accordingly, the reference Vref+ is subtracted from Va+ to produce a feedback signal Vb+ and the reference Vref− is then added to Va− to produce a feedback signal Vb−. On the other hand, if Va− is larger than Va+, the operation will be opposite to the above. The feedback signals Vb+ and Vb− are then fed back into the amplifier 820 by the feedback switches 860S and 860R for processing subsequent bits. This process repeats until the desired number of bits have been obtained. Thus, the digital data from the converter 800 is a series of bits where the first bit is the most significant bit and last bit is the least significant bit.

Figure 9:
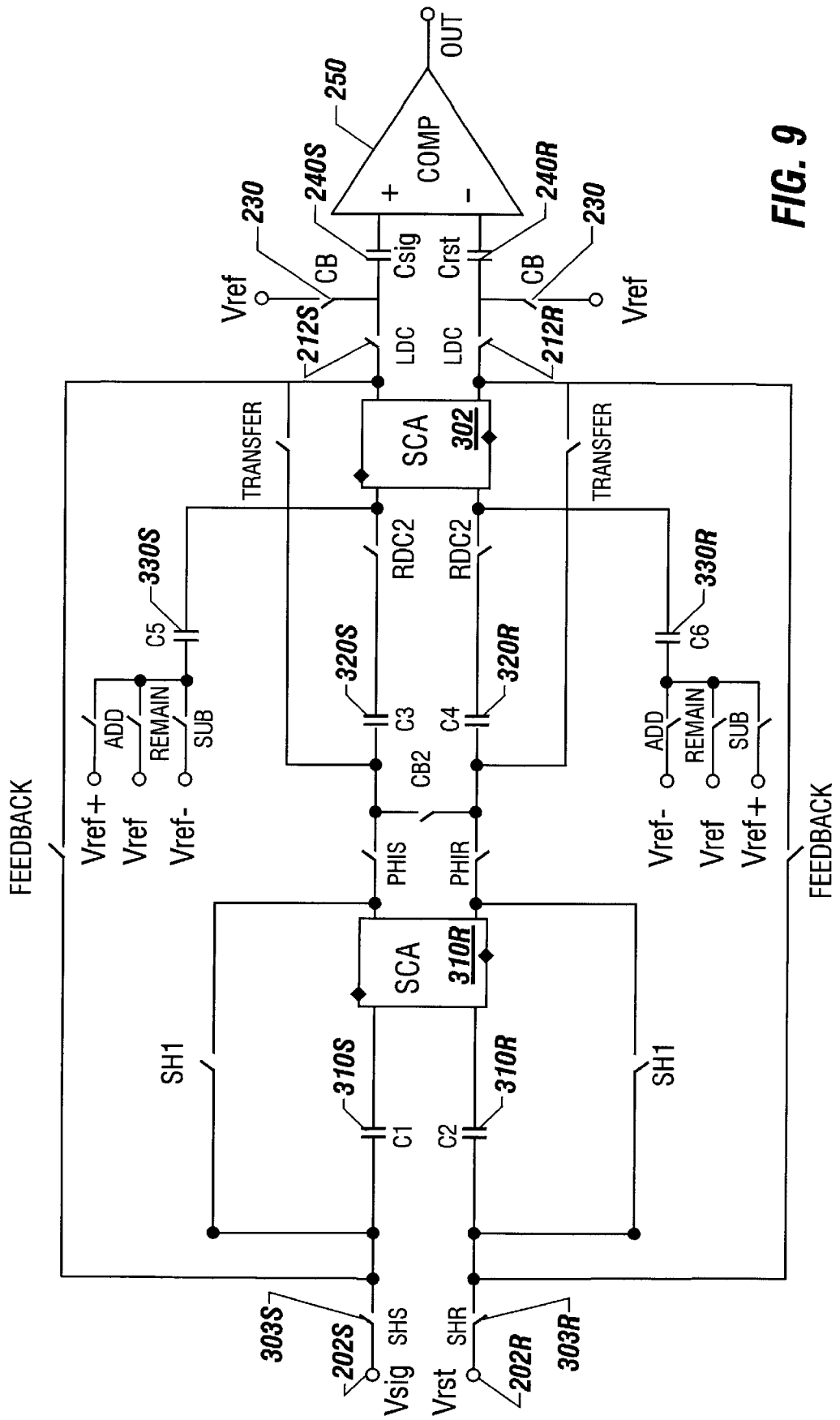
FIG. 9 shows one configuration of the programmable analog arithmetic circuit cell for performing analog-to-digital conversion based on the circuit in FIG. 8.
Figure 9A:
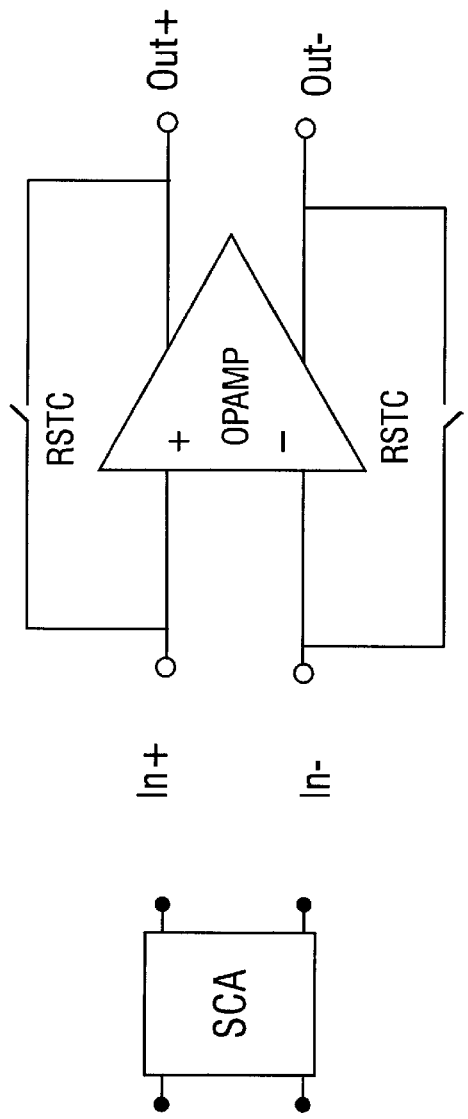
FIG. 9A shows the circuit configuration of the sample-and-hold integrator in FIG. 9.
Figure 9B:
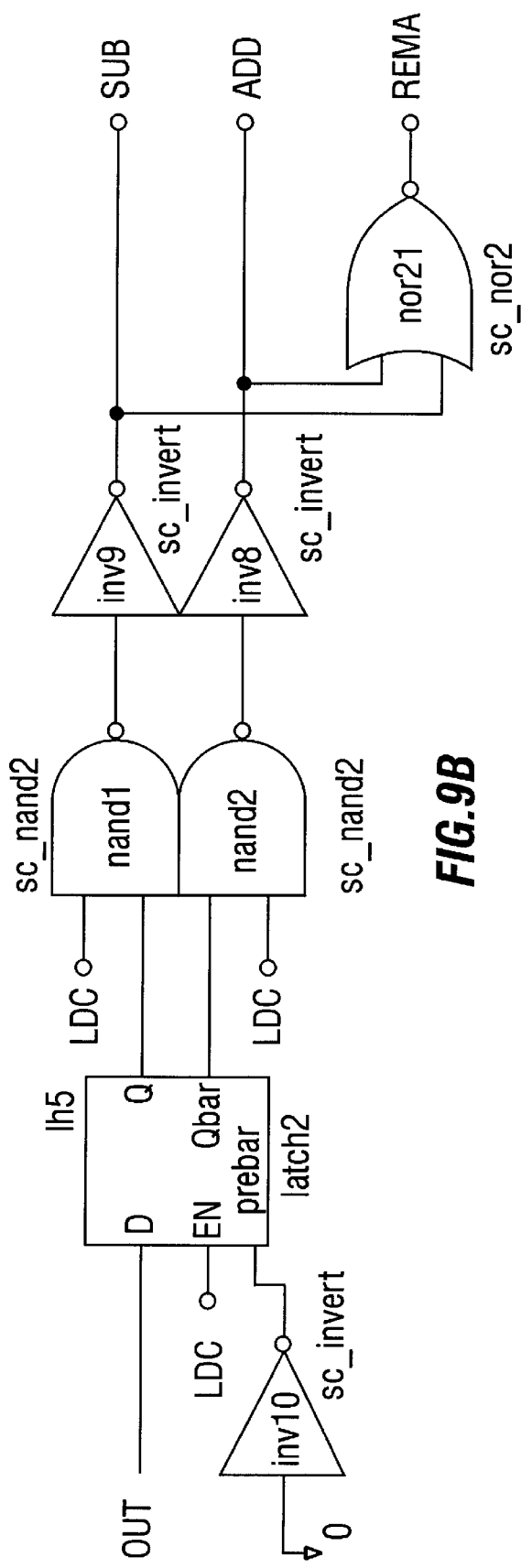
FIG. 9B shows a self-timed circuit for producing feedback signals in the circuit of FIG. 9.

FIG. 9 shows a cyclic ADC 900 formed from one configuration of the PAAC unit 210 and the comparator 250. The first switched capacitor integrator 301 is configured as shown in FIG. 9A by proper switching to function as a sample-and-hold amplifier. The second switched capacitor integrator 302 forms a multiply-by-two amplifier. FIG. 9B shows the self-timing control logic for reference voltage subtraction and addition, which is integrated as part of each arithmetic cell. The cyclic ADC 900 has a number of advantages. For example, the cyclic configuration allows the ADC 900 to share the integrators 301 and 302 that are used to perform arithmetic operations. In addition, the differential operation mode of the signal side and the reset side automatically eliminates any common-mode offset, e.g., fixed pattern noise, from the digital output of the comparator 840.

Figure 10:
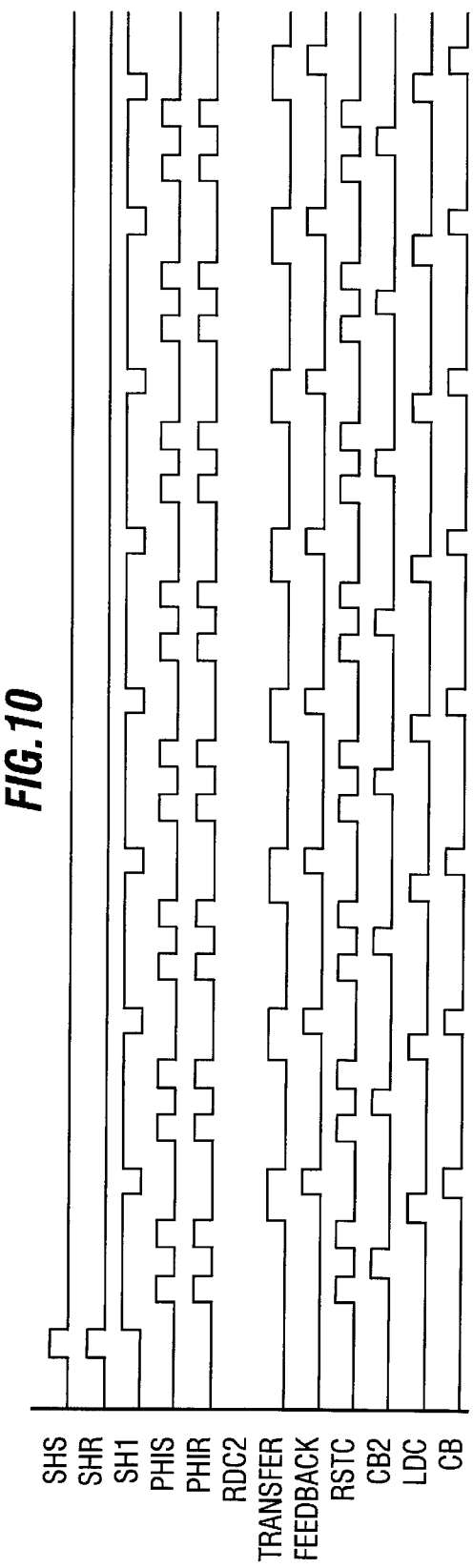
FIG. 10 shows the timing diagram for the circuit in FIG. 9.

The operation of the cyclic ADC 900 is illustrated in the timing diagram in FIG. 10 for 8-bit analog-to-digital conversion. The differential signal is introduced through the selection switches SHS and SHR and is sampled onto the S/H amplifier. While this voltage value is held, it is multiplied by two by the switched capacitor amplifier 302 using ratio-independent algorithm disclosed in Li et al., supra. This multiplication is achieved in two steps. First, the input values Vsig(C3) and Vrst(C4) to the capacitors C3 and C4 are respectively accumulated onto the integrating capacitors Cs1 and Cs2 in the integrator 302 by setting RSTC=RSTC1=0 and CYCLIC=RSTCB=1. The output signals on both the signal side and the reset side of the integrator 302 are (C3/Cs1)Vsig(C3) and (C4/Cs2)Vrst(C4), respectively, which depend on capacitor ratios (C3/Cs1) and (C4/Cs2). Second, by setting RSTC=RSTCB=1 and CYCLIC=RSTC1=0, the input values are sampled in the capacitors C3 and C4 one more time. Next, RSTCB is turned off and RSTC1 and TRANSFER are on in order to exchange the positions of the integrating capacitor and the sampling capacitor on both signal side and the reset side. The previously accumulated values (C3/Cs1)Vsig in Cs1 and (C4/Cs2)Vrst in Cs2 as inputs are accumulated one more time in the C3 and C4 to generate 2(Cs1/C3)(C3/Cs1)Vsig=2Vsig and 2(Cs2/C4)(C4/Cs2)=2Vrst, respectively, which are independent of the capacitor ratios (C3/Cs1) and (C4/Cs2).

Two complementary reference voltage Vref+ and Vref− are provided to the signal side and reset side loops through capacitors 330S (C5) and 330R (C6), respectively. The capacitors C5 and C6 allow both the subtraction and addition of the reference voltages. The switch labeled FEEDBACK feeds the signal back into the loop. This converter takes six clock cycles to complete a 1-bit conversion. Hence, the total conversion time for 8-bit conversion is 48 clock cycles.

Figure 9C:
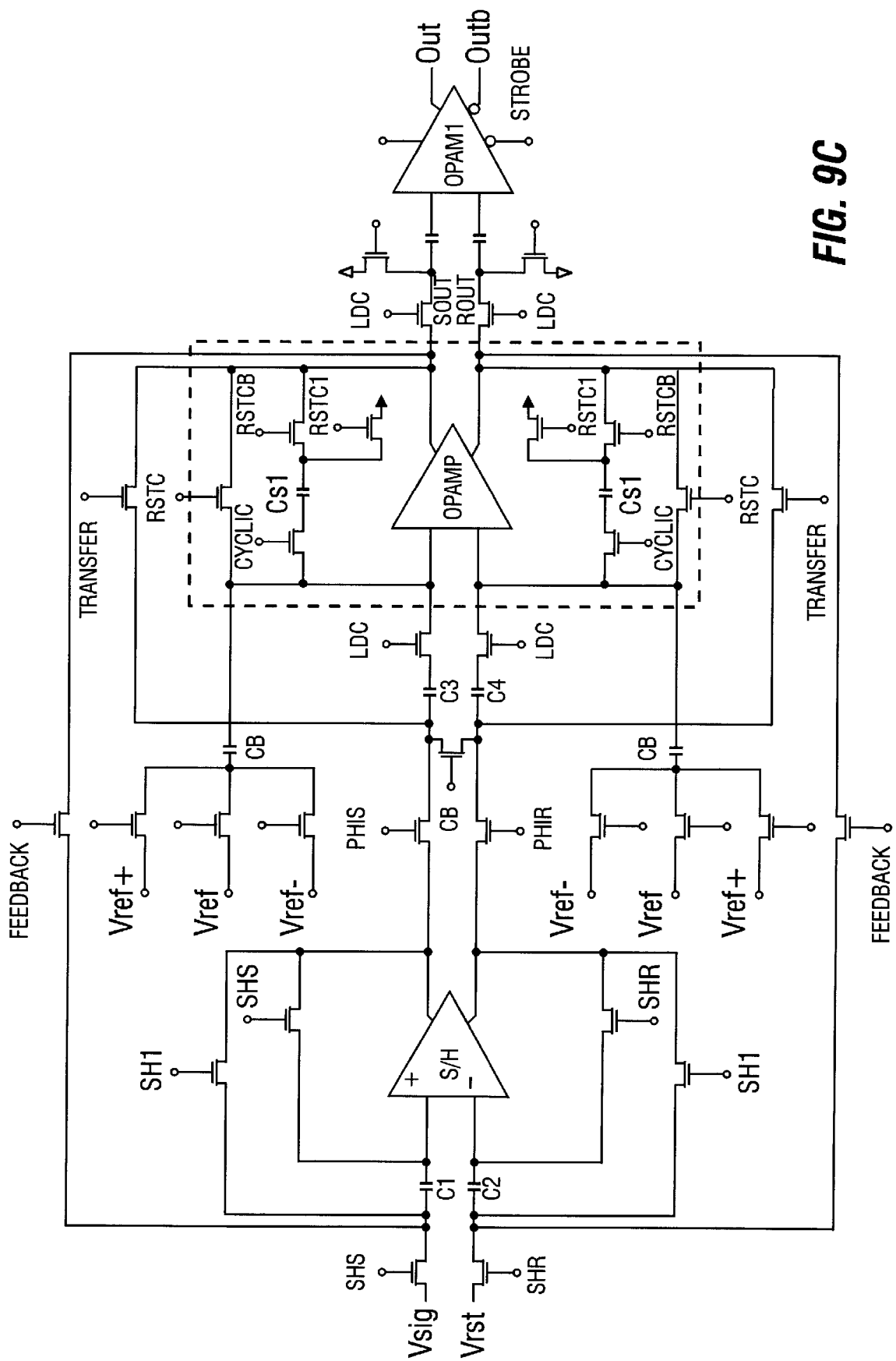
FIG. 9C shows a circuit implementation of the circuit of FIG. 9.

FIG. 9C shows one circuit implementation of the ACD in FIG. 9. TABLE 1 illustrates the conversion process in a 5-bit conversion by using this circuit, where Vref+=1V and Vref−=−1V.

TABLE 1

| Vin+ | Vin− | Va+ | Va− | Vb+ | Vb− | Output |
|------|------|-----|-----|-----|-----|--------|
| 0.8  | −0.8 | 1.6 | −1.6 | 0.6 | −0.6 | 1 |
|      |      | 1.2 | −1.2 | 0.2 | −0.2 | 1 |
|      |      | 0.4 | −0.4 | −0.6 | 0.6 | 0 |
|      |      | −1.2 | 1.2 | −0.2 | 0.2 | 0 |
|      |      | −0.4 | 0.4 | 0.6 | −0.6 | 1 |

4. General Arithmetic Operations

The above arithmetic circuit 120 can be configured by proper switching to perform addition, subtraction, multiplication, and division as general arithmetic operations. Hence, any other operations based on the above general arithmetic operations can be performed.

For example, the PAAC unit 210 can be configured into a switched capacitor integrator shown in FIG. 5A to carry out basic addition operations. The PAAC unit 210 can also be switched into the configuration of FIG. 7A to perform additions. Furthermore, the switches ADD in the PAAC unit 210 can be used to add and the switches SUB can be used to subtract. Multiplication may be implemented as two or more additions.

Figure 11:
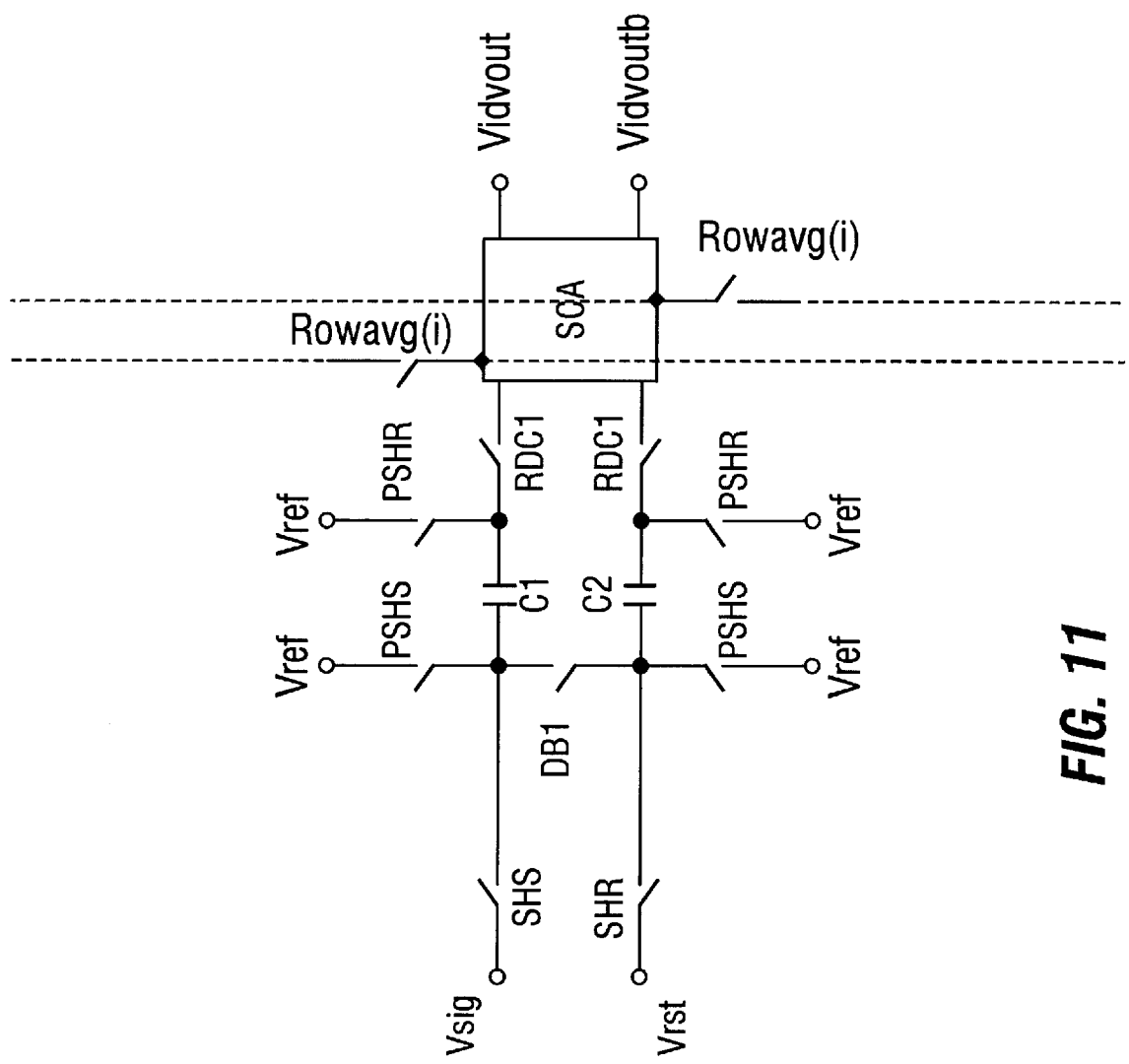
FIG. 11 shows one configuration of the programmable analog arithmetic circuit cell for performing division.

FIG. 11 shows one configuration of the PAAC unit 210 for performing a division by 3. Three arithmetic cells are needed to perform the division. First, the pixel signal and reset values are respectively sampled into the sampling capacitors C1 and C2 when switches SHS and SHR are on and the switch CB1 is off. The sampled values for signal side and the reset side are transferred onto capacitor Cs1 and Cs2 of the integrator 301 of the first column by turning on switch CB1 and switch RDC1(1) of first column. Next, the Rowavg switches for the first and second columns are turned on by setting Rowavg(1)=1, Rowavg(2)=1 while the Rowavg switch for the third column remains off (Rowavg(3)=0). This operation distributes the accumulated charge in each of the capacitors Cs1 and Cs2 in the first column and the respective capacitors in the second and third columns which is one third of the pixel value.

For multiple arithmetic operations, the FEEDBACK switch can be used to feed back any value at any time as needed. Hence, the arithmetic circuit 120 can be used to perform a wide range of operations without additional circuit elements. Such versatile resource-sharing circuit can be integrated on an imaging sensor chip for many imaging processing applications. The on-chip column parallel cyclic ADC provides flexibility of a digital interface and greatly enhances system robustness through noise immunity. This is in part because the digital output is immune from electromagnetic pickup and crosstalk. In addition, integration of the ADC on the sensor chip also simplifies the overall system design.

The arithmetic circuit 120 can provide programmable multiresolution capabilities to the imaging device 100 in FIG. 1. The block averaging can be used to produce images of variable resolutions for machine vision algorithms such as stereo vision range finding. The resolution can be adjusted according to the lighting conditions and the field of view of the target object. This functionality can enhance the speed performance of those algorithms and provide the flexibility in selecting a desired image size. The block summing can be used to sum pixel signals of pixel blocks in different sizes when desired in order to increase the effective dynamic range of the device. Therefore, the block averaging and the block summing of the arithmetic circuit 120 provides a light-adaptive sensing mechanism in the imaging device 100 (e.g., the light adaptable machine vision algorithm). This feature is especially desirable in imaging applications under variable lighting conditions.

The above arithmetic circuit 120 also inherently has image signal compression property. The chip using PAAC could be used in a pyramid coding scheme useful for image compression and progressive transmission. The PAAC could be used to find its way into 3-D recognition and stereo image compression systems, enhancing performance by facilitating some processing tasks such as finding correspondence, reducing block matching operation with block averaging.

The arithmetic circuit 120 may also be used for basic image processing operations such as generating the binary image with multiple threshold because of PAAC subtraction capability, simple edge detection, etc. Such features are useful in pattern recognition area and machine vision systems. Furthermore, on-chip motion detection capability based on the difference between two image frames can also be implemented in the arithmetic circuit 120. This feature is essential to a system that tracks moving targets.

The above and other signal processing capabilities can be integrated on the imaging sensor chip because of the resource sharing architecture of the arithmetic circuit 120. Such resource sharing allows implementation of multiple arithmetic circuit modules in a remarkably reduced silicon area and makes such implementation commercially viable.

Although only a few embodiments are disclosed, various modifications and enhancements may be made. For example, the above circuits use two parallel signal paths, one for signals associated with Vsig and another for signals associated with Vrst, in order to take advantage of the two outputs from the APS image sensor for reducing noise. However, in general, the above circuits can be operated with only one of the two signal paths or may be constructed to have only one signal path. Also, the number and the manner of the communication channels between different columns may be changed to meet the specific needs of an application. In addition, the deployment of the electronic switches and associated switching schemes may be also be modified based on the embodiments disclosed herein. These and other variations are within the scope and spirit of the disclosure and are understood to be encompassed by the following claims.

What is claimed is:

1. A semiconductor imaging device, comprising:
   a substrate formed of a semiconductor material;
   a sensor array of photosensitive elements on said substrate to convert an image into pixel signals;
   a reconfigurable arithmetic circuit, formed on said substrate, having a plurality of circuit elements and a plurality of switches to perform first and second arithmetic operations on said pixel signals; and
   a control circuit coupled to control a first set of said switches in said reconfigurable arithmetic circuit to couple a first set of said circuit elements to form a first circuit to perform said first arithmetic operation, and to control a second set of said switches to couple a second set of circuit elements which includes at least part of said first set of circuit elements to form a second circuit to perform said second arithmetic operation.

2. A device as in claim 1, wherein one of said first and second circuits is operable to select a block of pixels in said sensor array and to produce a block average of pixel electrical signals of said block.

3. A device as in claim 1, wherein one of said first and second circuits is operable to select a block of pixels in said sensor array and to produce a block sum of pixel electrical signals of said block.

4. A device as in claim 1, wherein one of said first and second circuits effects an analog-to-digital converter to convert said pixel electrical signals into digital form.

5. A device as in claim 1, wherein said photosensitive elements include active pixel sensors, with CMOS image sensor parts, and an in-pixel buffer circuit and an in-pixel select transistor.

6. A device as in claim 1, wherein said sensor array is a CMOS active pixel sensor array.

7. A method for operating a circuit to process signals from an imaging sensor array on an image sensor substrate, comprising:
  coupling a first set of circuit elements, on the image sensor array substrate, to form a first circuit to perform a first signal operation that changes a signal from the imaging sensor array; and
  coupling a second set of circuit elements, on the image sensor substrate, different from said first set bu including at least one common element from said first set, to form a second circuit to perform a second signal operation.

8. A method as in claim 7, wherein said common circuit element includes an amplifier.

9. A method as in claim 7, wherein said first circuit is a block summing circuit to produce a sum of selected adjacent pixels and said second circuit is a block averaging circuit to produce an average of selected adjacent pixels.

10. A semiconductor imaging device, comprising:
  a substrate;
  a sensor array of pixels, on said substrate, to detect an input image, wherein each pixel is configured to produce a pixel signal indicative of a total of photo-induced pixel signal and non-photon-induced background signal and a pixel reset signal indicative of said non-photon-induced background signal;
  a reconfigurable arithmetic circuit, on said substrate, having an array of column-parallel arithmetic cells respectively coupled to columns of said sensor array and reconfigurable to form different arithmetic circuits to perform arithmetic operations on signals from said sensor array, each arithmetic cell comprising:
    (1) a first signal sampling capacitor to receive said pixel signal and a first reset sampling capacitor to receive said pixel reset signal,
    (2) a first switched capacitor integrator having a signal channel coupled to said first signal sampling capacitor and a reset channel coupled to said first reset sampling capacitor,
    (3) a second signal sampling capacitor and a second reset sampling capacitor respectively coupled to said signal and reset channels of said first switched capacitor integrator,
    (4) a second switched capacitor integrator having a signal channel and a reset channel respectively coupled to said second signal sampling capacitor and second reset sampling capacitor,
    (5) a plurality of electronic switches coupled to control said sampling capacitors and said integrators and their interconnections,
    (6) a plurality of communication channels having switches to couple each arithmetic cell to at least one adjacent arithmetic cell; and
  a control circuit, on said substrate, coupled to said arithmetic cells and to control each arithmetic cell to perform at least addition, subtraction, multiplication, and division operations on signals from said sensor array.

11. A device as in claim 10, wherein each of said electronic swithes includes a transistor which has a gate coupled to receive a control signal caused by said control circuit.

12. A device as in claim 10, wherein said sensor array is an active pixel array, each pixel having a CMOS image sensor, an in-pixel buffer, and an in-pixel select transistor.

13. A device as in claim 10, wherein said communication channels include:
  a first signal communication channel to couple one terminal of said first signal sampling capacitor in said arithmetic cell to a corresponding terminal of a corresponding first signal sampling capacitor in said at least one adjacent arithmetic cell;
  a first reset communication channel to couple one terminal of said first reset sampling capacitor in said arithmetic cell to a corresponding terminal of a corresponding first reset sampling capacitor in said at least one adjacent arithmetic cell;
  a second signal communication channel to couple one terminal of said second signal sampling capacitor in said arithmetic cell to a corresponding terminal of a corresponding second signal sampling capacitor in said at least one adjacent arithmetic cell; and
  a second reset communication channel to couple one terminal of said second reset sampling capacitor in said arithmetic cell to a corresponding terminal of a corresponding second reset sampling capacitor in said at least one adjacent arithmetic cell.

14. A device as in claim 10, wherein said first switched capacitor integrator includes a signal integrating capacitor in said signal channel and a reset integrating capacitor in said reset channel, and
  wherein said communication channels include a signal capacitor channel to couple one terminal of said signal integrating capacitor in said arithmetic cell to a corresponding terminal of a corresponding signal integrating capacitor in said at least one adjacent arithmetic cell and reset capacitor channel to couple one terminal of said reset integrating capacitor in said arithmetic cell to a corresponding terminal of a corresponding reset integrating capacitor in said at least one adjacent arithmetic cell.

15. A device as in claim 10, further comprising:
  a signal channel feedback loop having a switch and coupled to feed a signal output from said second switched capacitor integrator to a signal input of said first switched capacitor integrator; and
  a reset channel feedback loop having a switch and coupled to feed a reset output from said second switched capacitor integrator to a reset input of said first switched capacitor integrator.

16. A semiconductor imaging device, comprising:
  a sensor array of pixels to detect an input image, wherein each pixel is configured to produce a pixel signal indicative of a total of photo-induced pixel signal and non-photo-induced background signal and a pixel reset signal indicative of said non-photo-induced background signal;

a reconfigurable arithmetic circuit having an array of column-parallel arithmetic cells respectively coupled to columns of said sensor array and reconfigurable to form different arithmetic circuits to perform arithmetic operations on signals from said sensor array, each arithmetic cell comprising, (1) a first signal sampling capacitor to receive said pixel signal and a first reset sampling capacitor to receive said pixel reset signal, (2) a first switched capacitor integrator having a signal channel coupled to said first signal sampling capacitor and a reset channel coupled to said first reset sampling capacitor, (3) a second signal sampling capacitor and a second reset capacitor respectively coupled to said signal and reset channels of said first switched capacitor integrator, (4) a second switched capacitor integrator having a signal channel and a reset channel respectively coupled to said second signal sampling capacitor and second reset capacitor, and (5) a comparator coupled to said second switched capacitor integrator; and a control circuit coupled to control a selected block of arithmetic cells to form a block summing circuit based on said first and second switched capacitor integrators and to form a block averaging circuit based on said first switched capacitor integrator in said selected block, and to control each arithmetic cell to form a cyclic analog-to-digital converter based on said first, second switched capacitor integrator, and said comparator.

17. A device as in claim 16, further comprising a semiconductor substrate and wherein said sensor array and said arithmetic circuit are formed on said semiconductor substrate.

18. A device as in claim 17, wherein said arithmetic circuit is a CMOS circuit.

19. A device as in claim 17, wherein said sensor array is an active pixel array.

20. A semiconductor imaging device, comprising:

a substrate;

a sensor array of pixels, on said substrate, to detect an input image, wherein each pixel is configured to produce a pixel signal in response to received photons;

a reconfigurable arithmetic circuit, on said substrate, having an array of column-parallel arithmetic cells respectively coupled to columns of said sensor array and reconfigurable to form different arithmetic circuits to perform arithmetic operations on signals from said sensor array, each arithmetic cell comprising:

(1) a first signal sampling capacitor to receive said pixel signal, (2) a first switched capacitor integrator coupled to said first signal sampling capacitor, (3) a second signal sampling capacitor coupled to said first switched capacitor integrator, (4) a second switched capacitor integrator coupled to said second signal sampling capacitor, (5) a plurality of electronic switches coupled to control said sampling capacitors and said integrators and their interconnections, (6) a plurality of communication channels having switches to couple each arithmetic cell to at least one adjacent arithmetic cell; and a control circuit, on said substrate, coupled to said arithmetic cells and to control each arithmetic cell to perform at least addition, subtraction, multiplication, and division operations on signals from said sensor array.

21. A device as in claim 20, wherein said sensor array is an active pixel array, each pixel having a CMOS image sensor, an in-pixel buffer, and an in-pixel select transistor.

22. A device as in claim 20, wherein said communication channels include:

a first signal communication channel to couple one terminal of said first signal sampling capacitor in said arithmetic cell to a corresponding terminal of a corresponding first signal sampling capacitor in said at least one adjacent arithmetic cell; and a second signal communication channel to couple one terminal of said second signal sampling capacitor in said arithmetic cell to a corresponding terminal of a corresponding second signal sampling capacitor in said at least one adjacent arithmetic cell.

23. A device as in claim 20, wherein said first switched capacitor integrator includes a signal integrating capacitor, and wherein said communication channels include a signal capacitor channel to couple one terminal of said signal integrating capacitor in said arithmetic cell to a corresponding terminal of a corresponding signal integrating capacitor in said at least one adjacent arithmetic cell.

* * * * *